US009374276B2

(12) United States Patent
Batrouni et al.

(10) Patent No.: US 9,374,276 B2
(45) Date of Patent: Jun. 21, 2016

(54) CDN TRAFFIC MANAGEMENT IN THE CLOUD

(71) Applicant: Microsoft Technology Licensing, LLC, Redmond, WA (US)

(72) Inventors: Marwan Batrouni, Bellevue, WA (US); Jason Drew Zions, Bellevue, WA (US); Octavian Homoiu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 13/666,651

(22) Filed: Nov. 1, 2012

(65) Prior Publication Data

US 2014/0122698 A1    May 1, 2014

(51) Int. Cl.
| | | |
|---|---|---|
| *G06F 15/16* | (2006.01) | |
| *H04L 12/24* | (2006.01) | |
| *H04L 29/08* | (2006.01) | |
| *H04L 12/26* | (2006.01) | |

(52) U.S. Cl.
CPC ........ *H04L 41/0896* (2013.01); *H04L 43/0876* (2013.01); *H04L 67/2833* (2013.01)

(58) Field of Classification Search
CPC .............. G06F 9/5061; G06F 11/3409; G06F 11/3414; H04L 41/0896; H04L 43/0876; H04L 67/2833
USPC ................................................. 709/224, 226
See application file for complete search history.

(56) References Cited

U.S. PATENT DOCUMENTS

| | | | |
|---|---|---|---|
| 6,625,795 | B1 | 9/2003 | Anderson et al. |
| 7,047,315 | B1 | 5/2006 | Srivastava |
| 7,660,896 | B1 | 2/2010 | Davis et al. |
| 8,166,108 | B1 | 4/2012 | Peters et al. |
| 8,194,680 | B1 | 6/2012 | Cohn et al. |
| 8,209,415 | B2 | 6/2012 | Wei |
| 8,510,807 | B1 | 8/2013 | Elazary et al. |

(Continued)

OTHER PUBLICATIONS

International Search Report & Written Opinion for PCT Patent Application No. PCT/US2013/067907, Mailed Date: May 13, 2014, Filed Date: Nov. 1, 2013, 17 pages.

(Continued)

*Primary Examiner* — Glenton B Burgess
*Assistant Examiner* — Tan Doan
(74) *Attorney, Agent, or Firm* — Ben Tabor; Doug Barker; Micky Minhas

(57) ABSTRACT

Embodiments include determining attributes of a property using an incubation pool. An incubation period is identified based on estimated attributes for the property, and based on rules that define a minimum and a maximum incubation time. The property is added to the incubation pool, and load and patterns for the property are analyzed. A load size and/or a traffic type for the property is identified based on the incubation. Embodiments also include offloading traffic within a CDN. A load balancer agent determines that traffic at an edge data center should be offloaded to the other edge data centers. The load balancer agent sends a request, including a determined priority level. The load balancer agent receives one or more replies indicating that resources are available for use. The load balancer agent sorts the replies and offloads traffic to at least one edge data center.

20 Claims, 5 Drawing Sheets

(56) References Cited

U.S. PATENT DOCUMENTS

| | | | |
|---|---|---|---|
| 8,626,910 B1 | 1/2014 | Lientz | |
| 8,650,299 B1 | 2/2014 | Huang et al. | |
| 2002/0009079 A1 | 1/2002 | Jungck et al. | |
| 2002/0065938 A1 | 5/2002 | Jungck et al. | |
| 2002/0143798 A1 | 10/2002 | Lisiecki et al. | |
| 2002/0163882 A1 | 11/2002 | Bornstein et al. | |
| 2002/0194324 A1 | 12/2002 | Guha | |
| 2002/0194350 A1 | 12/2002 | Lu et al. | |
| 2003/0233423 A1 | 12/2003 | Dilley et al. | |
| 2004/0010621 A1 | 1/2004 | Afergan et al. | |
| 2004/0083283 A1 | 4/2004 | Sundaram et al. | |
| 2005/0149940 A1* | 7/2005 | Calinescu et al. | 718/104 |
| 2006/0195578 A1* | 8/2006 | Ishida et al. | 709/226 |
| 2007/0061441 A1 | 3/2007 | Landis et al. | |
| 2007/0162584 A1 | 7/2007 | Kokusho et al. | |
| 2008/0021996 A1* | 1/2008 | Chambliss et al. | 709/224 |
| 2009/0164660 A1 | 6/2009 | Abrams | |
| 2009/0183168 A1 | 7/2009 | Uchida | |
| 2009/0235265 A1 | 9/2009 | Dawson et al. | |
| 2009/0254661 A1 | 10/2009 | Fullagar et al. | |
| 2009/0262741 A1 | 10/2009 | Jungck et al. | |
| 2010/0106934 A1 | 4/2010 | Calder et al. | |
| 2010/0157841 A1* | 6/2010 | Puthenpura et al. | 370/253 |
| 2010/0223364 A1 | 9/2010 | Wei | |
| 2010/0332595 A1 | 12/2010 | Fullagar et al. | |
| 2011/0209156 A1* | 8/2011 | Box et al. | 718/104 |
| 2011/0224946 A1* | 9/2011 | Brayman | 702/176 |
| 2011/0277026 A1 | 11/2011 | Agarwal et al. | |
| 2012/0102154 A1 | 4/2012 | Huang et al. | |
| 2012/0167081 A1 | 6/2012 | Sedayao et al. | |
| 2012/0233329 A1 | 9/2012 | Dickinson et al. | |
| 2012/0260019 A1 | 10/2012 | Malalyandisamy et al. | |
| 2012/0284408 A1 | 11/2012 | Dutta et al. | |
| 2012/0317578 A1 | 12/2012 | Kansal et al. | |
| 2013/0073808 A1 | 3/2013 | Puthalath et al. | |
| 2013/0166724 A1 | 6/2013 | Bairavasundaram et al. | |
| 2013/0179931 A1 | 7/2013 | Osorio et al. | |
| 2013/0191499 A1 | 7/2013 | Ludin et al. | |
| 2013/0250770 A1 | 9/2013 | Zou et al. | |
| 2013/0297672 A1 | 11/2013 | McGrath et al. | |
| 2014/0052825 A1 | 2/2014 | Luecke et al. | |
| 2014/0067758 A1 | 3/2014 | Boldyrev et al. | |
| 2014/0068703 A1 | 3/2014 | Balus et al. | |
| 2014/0075048 A1 | 3/2014 | Yuksel et al. | |
| 2014/0122725 A1 | 5/2014 | Batrouni et al. | |
| 2014/0250168 A1 | 9/2014 | Damola et al. | |
| 2014/0325072 A1 | 10/2014 | Zhang et al. | |
| 2014/0325577 A1 | 10/2014 | Garcia Mendoza et al. | |

OTHER PUBLICATIONS

"International Search Report & Written Opinion for PCT Patent Application No. PCT/US2013/067906", Mailed Date: Feb. 6, 2014, Filed Date: Nov. 1, 2013, 15 Pages.

Speitkamp, et al., "A Mathematical Programming Approach for Server Consolidation Problems in Virtualized Data Centers", In IEEE Transactions on Services Computing, vol. 3, Issue 4, Oct. 2010, pp. 266-278.

Bichler, et al., "Capacity Planning for Virtualized Servers", In Workshop on Information Technologies and Systems, Dec. 2006, 6 Pages.

Zhang, et al., "Dynamic Service Placement in Geographically Distributed Clouds", In International Conference on Distributed Computing Systems, Jun. 18, 2012, pp. 526-535.

Fang, et al., "RPPS: A Novel Resource Prediction and Provisioning Scheme in Cloud Data Center", In International Conference on Services Computing, Jun. 24, 2012, pp. 609-616.

Srikantaiah, et al., "Energy Aware Consolidation for Cloud Computing", In Conference on Power Aware Computing and Systems, Dec. 7, 2008, 5 Pages.

Lu, et al., "Simple and Effective Dynamic Provisioning for Power-Proportional Data Centers", In IEEE Transactions on Parallel and Distributed Systems, vol. 24, Issue 6, Jun. 2013, pp. 1161-1171.

Li, et al., "Utilizing Content Delivery Network in Cloud Computing", In International Conference on Computational Problem-Solving, Oct. 19, 2012, pp. 137-143.

Office Action dated Nov. 14, 2014 cited in U.S. Appl. No. 13/666,691.

"Cloud Load Balancer", Retrieved on: Jul. 20, 2012, Available at: http://www.cdnetworks.com/wp-content/uploads/2012/02/CDNetworks_Cloud-Load-Balancer_BR_20120215.pdf.

Zhu, et al., "Multimedia Cloud Computing", In IEEE Signal Processing Magazine, vol. 28, Issue 3, May 2011, 11 pages.

Ranjan, et al., "Peer-to-Peer Cloud Provisioning: Service Discovery and Load-Balancing", In Cloud Computing of Computer Communications and Networks, Jul. 20, 2012, 23 pages.

Zhang, et al., "Intelligent Workload Factoring for a Hybrid Cloud Computing Model", In Proceeding of World Conference of Services—I, Jul. 6, 2009, 8 pages.

Lin, et al.,"The Study and Methods for Cloud Based CDN", In Proceeding of International Conference on Cyber-Enabled Distributed Computing and Knowledge Discovery, Oct. 10, 2011, 7 pages.

International Preliminary Report on Repeatability Issued in PCT Application No. PCT/US2013/067907, Mailed Date: Nov. 13, 2014, 9 Pages.

U.S. Appl. No. 13/666,691, Jul. 23, 2015, Office Action.

Office Action dated Jan. 29, 2016 in U.S. Appl. No. 13/666,691.

* cited by examiner

CDN TRAFFIC MANAGEMENT IN THE CLOUD

BACKGROUND

Many Internet-based service providers deliver digital content to clients around the world. Digital content may include web objects (e.g., text, graphics, URLs, scripts), downloadable objects (e.g., media files, software, documents), web applications, streaming media (e.g. audio and video content), etc. Providing digital content to numerous clients that are located in a broad variety geographical locations can present challenges to service providers. For example, a service provider may be unable to provide sufficient server resources and/or network bandwidth to serve all clients requesting digital content at a given time. In addition, clients that are geographically remote from a service provider's servers may experience high levels of latency and/or low transfer rates as traffic between the service provider and the client is routed through a large number of Internet servers and over great geographical distances.

Content Delivery Networks (CDNs) aim to ease the ability of service providers to deliver digital content to large and/or geographically diverse groups of clients. CDNs position servers (or clusters of servers) in various geographical locations, and use these servers to cache and deliver content from origin servers of service providers. As such, CDNs can improve the service providers' ability to deliver content to clients both by increasing total available server resources and bandwidth used to deliver each service provider's content, and also by delivering each service provider's content from servers that are geographically nearer the clients that are being served.

CDNs often provide content delivery services for a large number of service providers. As such, CDNs allocate CDN resources among the various service providers. For example, if the CDN is experiencing a surge in traffic for a particular service provider in a particular geographical region, the CDN may reactively allocate additional server resources in the particular geographical region for use in delivering the particular service provider's content, while removing the additional server resources in the particular geographical region from one or more other service providers.

BRIEF SUMMARY

At least some embodiments described herein manage traffic within a CDN using both live and historical data. As such, the CDN can proactively, as opposed to reactively, reconfigure itself to handle current and anticipated client loads.

In some embodiments, attributes of a property are determined using an incubation pool. A computer system determines an incubation period based on an estimate of load size and traffic type for the property and based on rules that define a minimum and a maximum incubation time for properties that are added to the incubation pool. The computer system adds the property to the incubation pool, including allocating server resources of the incubation pool to the property. The computer system analyzes load and traffic patterns for the property for the determined incubation period, and determines a load size and/or a traffic type for the property based on adding the property to the incubation pool.

In other embodiments, a load balancer agent offloads traffic to other edge data centers in a CDN. The load balancer agent determines that traffic at the edge data center should be offloaded to the other edge data centers, and determines a priority level for requesting the offloading of traffic to the other edge data centers. The load balancer agent sends an offload request to each of the other edge data centers. Each offload request indicates the determined priority level. The load balancer agent receives one or more replies from the other edge data centers, including at least one reply indicating that resources are available for use by the load balancer agent. The load balancer agent sorts the replies to identify at least one edge data center for offloading traffic, and offloads traffic to the identified edge data center(s).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein manage traffic within a CDN using both live and historical data. As such, the CDN can proactively, as opposed to reactively, reconfigure itself to handle current and anticipated client loads.

More particularly, embodiments are directed to a CDN that services a plurality of properties and that includes a plurality of edge data centers that are physically located at different geographic locations (and potentially at geographic locations around the world). Each edge data center includes a plurality of servers that are used to cache and serve content of the properties. Embodiments are also directed to a CDN that includes a load balancer service that tracks long-term traffic trends for the plurality of edge data centers, and that manages rules for allocating server resources (based on the long term traffic trends) to the properties. Embodiments are also directed to a CDN that includes a load balancer agent at each edge data center. Each load balancer agent is configured to make server allocation decisions based on the rules that are based on long-term traffic trends, as well as real-time (or near real-time) data regarding present activity at the edge data center. As such, the load balancer agents make server allocation decisions proactively based on long-term traffic trends and rules, and reactively based on real-time (or near-real time) data.

As used herein, a "property" is a customer web application that is hosted on an origin server. For example, a "property" may be an online video streaming website, an online audio streaming service, a patch/updates website, etc. As used herein, a "customer" is a person, entity, service provider, etc. that owns one or more properties. As used herein, an "origin server" is a web server that is owned and/or operated by a customer.

Figure 1:
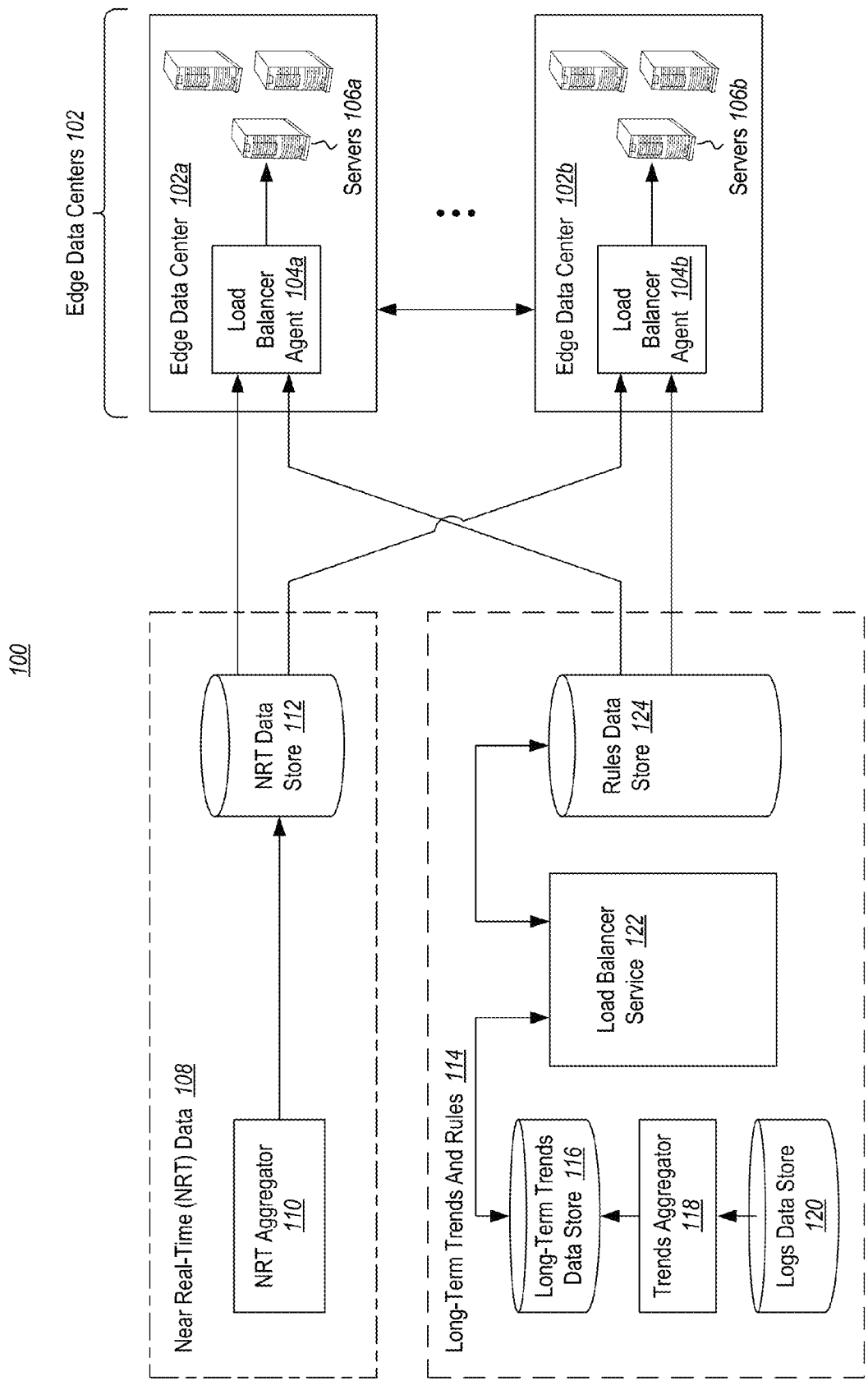
FIG. 1 illustrates an example computer architecture that facilitates both proactively and reactively configuring a CDN to handle current and anticipated client loads for properties hosted by the CDN.

FIG. 1 illustrates an example computer architecture 100 that facilitates both proactively and reactively configuring a CDN to handle current and anticipated client loads for properties hosted by the CDN. Referring to FIG. 1, computer architecture 100 includes edge data centers 102, one or more components 108 related to near real-time (NRT) data, and one or more components 114 related to long-term trends and rules. Each of the depicted components and computer systems are connected to one another over (or are part of) a network, such as, for example, a Local Area Network ("LAN"), a Wide Area Network ("WAN"), the Internet, etc. Accordingly, each of the depicted components and computer systems can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Edge data centers 102 comprise a plurality of data centers that are each located at different geographical locations. For example, FIG. 1 depicts edge data center 102a and edge data center 102b, though computer architecture 100 could include any number of edge data centers, as indicated by the vertical ellipses. As used herein, a "pop" (point of presence) also refers to an edge data center, whether the edge data center is dedicated as part of a CDN, or is collocated with other services.

As depicted, each edge data center 102 includes a plurality of servers (e.g., servers 106a and 106b) that are configured to cache content of properties that are associated with the edge data center and to deliver that content to clients (e.g., clients of the cached properties, that are geographically near the edge data center). Each edge data center 102 also includes a load balancer agent (e.g., load balancer agents 104a and 104b). The load balancer agents (104a, 104b) are configured to make both proactive and reactive decisions about how server resources (106a, 106b) at the corresponding edge data center are allocated to different properties. In doing so, the load balancer agents (104a, 104b) use rules (from a rules data store 124) that are based on long terms trends data, as well as NRT data (from a NRT data store 112).

As used herein, "NRT data" means data that is collected and aggregated in near real-time, such as within a few minutes or even within seconds. In the depicted embodiment, the component(s) 108 related to NRT data include a NRT aggregator 110 and NRT data store 112. NRT aggregator 110 parses logs generated at edge data centers 102 to generate NRT data about current activity at each edge data center. NRT aggregator 110 stores the generated NRT data in NRT data store 112. NRT data store 112 makes the NRT data available to load balancer agents (104a, 104b) at each edge data center (as indicated by the arrows between NRT data store 112 and the load balancer agents). Correspondingly, the load balancer agents are enabled to retrieve the NRT data from NRT data store 112 and to use the NRT data as part of their resource allocation decisions. Using NRT data, the load balancer agents are able to react to current traffic at the edge data centers 102, such as to deal with unexpected surges in traffic at one or more properties. While the component(s) 108 related to NRT data are depicted as being separate from edge data centers 102, all or part of these components may, in some embodiments, be implemented at the edge data centers 102.

In the depicted embodiment, the component(s) 114 related to long-term trends and rules include logs data store 120, trends aggregator 118, and long-term trends data store 116. Logs data store 120 is configured to store logs generated by edge data centers 102. Trends aggregator 118 is configured to parse these logs to ascertain long-term traffic patterns of the properties that are serviced by the edge data centers. Tends aggregator 118 stores long-term traffic patterns in long-term trends data store 116.

Long-term trends may identify changes in client demand for a property over days, weeks, months, or even years. For example, for a video-streaming property, long-term trends may indicate an increase in client demand on a particular day of the week (e.g., corresponding to the release of new content), in the evenings, and on the weekends. In another example, for a patch/updates property, long-term trends may indicate an increase in client demand on a particular day of the month (e.g., when new patch/update content is released), and at a particular time of day when many clients are configured to install patches/updates.

In the depicted embodiment, the component(s) 114 related to long-term trends and rules also include load balancer service 122 and rules data store 124. Load balancer service 122 is configured to analyze the traffic pattern data in long-term trends data store 116, to create/modify rules related to the assignment of servers at edge data centers 102 to various properties, and to store the rules in rules data store 124. Rules data store 124 makes the rules available to load balancer agents (104a, 104b) at each edge data center (as depicted by the arrows between rules data store 124 and the load balancer agents). Correspondingly, the load balancer agents are enabled to retrieve the rules from rules data store 124 and to use the rules as part of their resource allocation decisions.

As indicated by the double arrow between long-term trends data store 116 and load balancer service 122, load balancer service 122 may receive long-term trend data from long-term trends data store 116, and also provide feedback to long-term trends data store 116. For example, load balancer service 122 may refine/optimize the gathering of long-term trend data. In addition, as indicated by the double arrow between rules data store 124 and load balancer service 122, load balancer service 122 may both read rules from rules data store 124 and also provide rules input and adjustments to rules data store 124.

Figure 2:
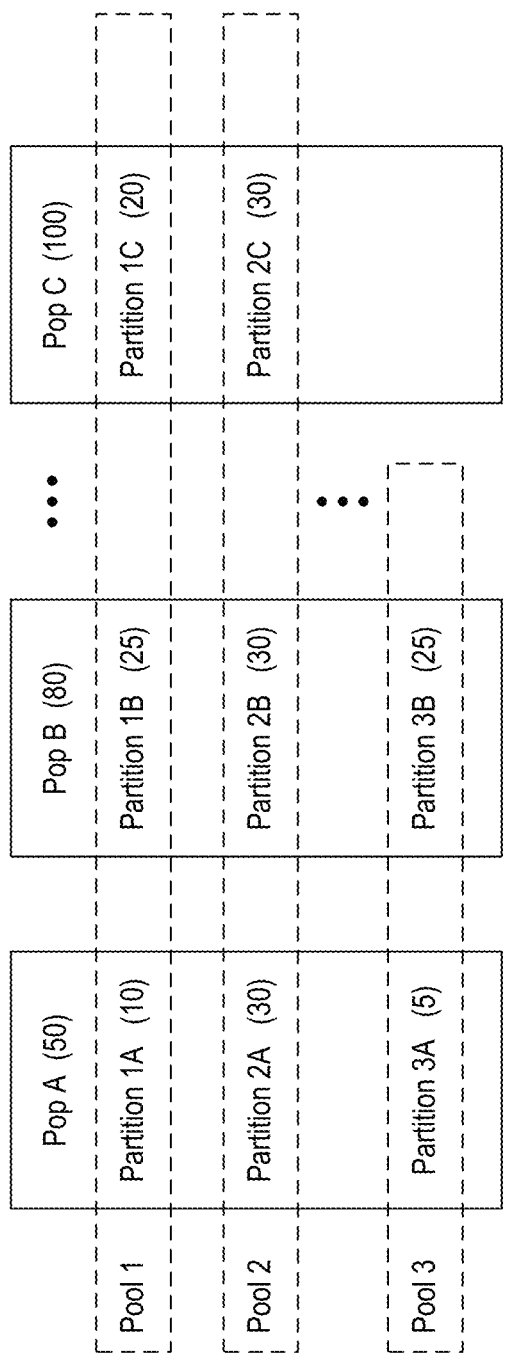
FIG. 2 illustrates an example scheme for dividing, partitioning, and/or allocating resources of an example CDN.

In some embodiments, a CDN assigns properties to pools that span edge data centers (pops). The set of servers at a particular pop that belong to a particular pool are a partition of that pool. These servers service the properties for the pool at the pop. FIG. 2, for example, illustrates an example scheme for dividing, partitioning, and/or allocating resources of an example CDN. The example CDN includes three pops (or edge data centers). These include "pop A" with 50 servers, "pop B" with 80 servers, and "pop C" with 100 servers. As indicated by the horizontal ellipses, the example CDN could include any number of pops.

As depicted, the example CDN divides the example CDN resources into a plurality of pools, including 'pool 1', 'pool 2', and 'pool 3'. As indicated by the vertical ellipses, the example CDN could include any number of pools. Each pool comprises a partition of one or more servers at one or more of the pops. For example, pool 1 includes partition 1A (10 servers) at pop A, partition 1B (25 servers) at pop B, and partition 1C (20 servers) at pop C. As depicted, pool 2 includes partitions (2A, 2B, and 2C) at pops A, B, and C, and pool 3 includes partitions (3A and 3B) at pops A and B.

Properties can be assigned to the pools. For example, five properties may be assigned to pool 1, 10 properties may be assigned to pool 2, and four properties may be assigned to pool 3. Correspondingly, servers in partitions of each pool are reserved to service the properties that are assigned the pool. For example, at pop A the servers of partition 1A are reserved to service the five properties assigned to pool 1, at pop B the 25 servers of partition 1B are reserved to service the five properties assigned to pool 1, and at pop B the 20 servers of partition 1C are reserved to service the five properties assigned to pool 1. In some embodiments, a property may be assigned to multiple pools, and those pools may be assigned to the same pop. Thus, a property may be assigned to multiple partitions (corresponding to different pools) at a single pop.

Within the context of FIGS. 1 and 2, there are a plurality of methodologies that can be employed as part of managing server allocations for servicing properties within a CDN.

1. Load-Balancing Algorithm

Embodiments include a load-balancing algorithm that is performed by each load balancer agent at edge data centers 102. Using the load-balancing algorithm, the each load balancer agent leverages both NRT data from NRT data store 112 and rules from rules data store 124 to make local server allocation decisions.

Figure 3:
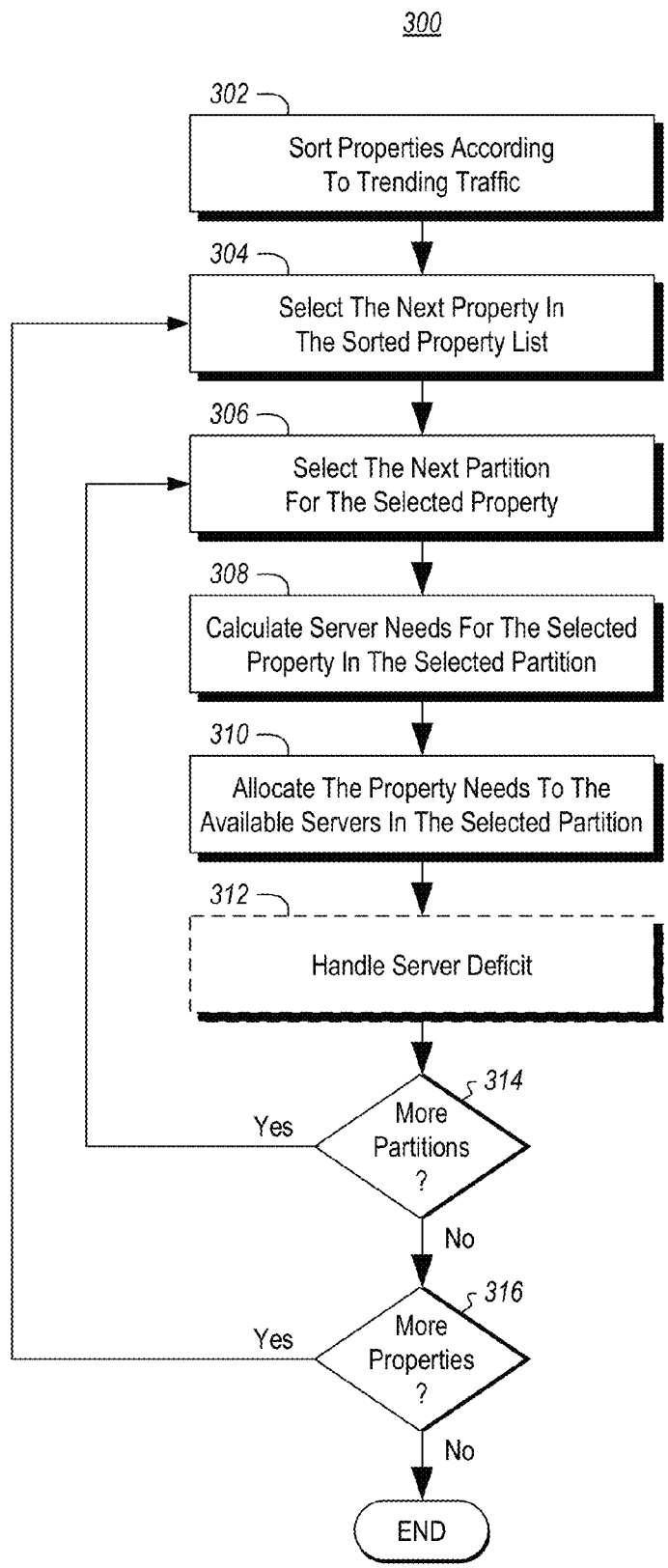
FIG. 3 illustrates a flow chart of an example method for allocating server resources at an edge data center of a CDN to properties serviced by the edge data center.

FIG. 3 illustrates a flow chart of an example method 300 for allocating server resources at an edge data center of a CDN to properties serviced by the edge data center. Method 300 will be described with respect to the components and data of computer architecture 100.

Method 300 comprises an act of sorting properties according to trending traffic (act 302). Act 302 can include an act of sorting, based on near real-time data, a plurality of properties by trending traffic at an edge data center. For example, load balancer agent 104a can compare NRT data from NRT data store 112 with rules from rules data store 124 to determine the type of traffic pattern one or more properties are undergoing at edge data center 102. Load balancer agent 104a can then sort the properties that are experiencing traffic surges (e.g., in descending order of priority) and place them in a sorted property list. The remainder of method 300 can then make resource allocation assignments according to the sorted property list so that surging properties are allocated server resources 106a before non-surging properties.

Method 300 also comprises an act of selecting the next property in the sorted property list (act 304) and an act of selecting the next partition for the selected property (act 306). For example, load balancer agent 104a can select the property having the greatest trending traffic in the sorted property list, and then select a first partition to which that property is assigned.

Method 300 also comprises an act of calculating server needs for the selected property in the selected partition (act 308). Act 308 can include an act of allocating server resources for at least one property of the sorted plurality of properties at the edge data center based on one or more rules developed from long-term trends, including calculating server needs for the at least one property in a partition at the edge data center. For example, act 308 can include load balancer agent 104a changing the load type of the property based on trending traffic and determining the server needs for the property based on the new load type.

In some embodiments, properties can be assigned a general load type within the rules, based on factors such as past traffic patterns for the property (e.g., as described later in connection with incubation), manual assignments, or specification from a customer. For example, each property may be categorized in each pop according to a "t-shirt size" (e.g., S, M, L, XL) based on its typical client load at that pop. Thus, in one embodiment, act 308 can include a load balancer agent using the NRT data to determine that current trending traffic will cause the property to reach a point that will result in a load type increase (e.g., from L to XL) or decrease at the pop. Based on the determination that the property needs a load type increase/decrease, the load balancer agent can assign the new load type to the property at the pop. Then, the load balancer agent can compute new server needs for the property based on the new load type.

Computing the new server needs can include retrieving the general server needs for a property of the new load type from the rules. For example, the rules may specify the general server needs of a property of load type XL are as shown in Table 1:

TABLE 1

| Property Load Type | Minimum Server Needs | Multiplier |
|---|---|---|
| XL | 20 | 10 |

Table 1 specifies minimum server needs and a multiplier. The minimum server needs is the count of totally dedicated servers capable of fulfilling 100% of the needs of a property of this type at the pop. The multiplier defines how much elastic margin should be allowed for a property of this type.

Computing the new server needs can also include calculating the pop load for the property. For example, based on its pool assignment, a property may be allocated across pops as shown in Table 2:

TABLE 2

| Property ID | Pop ID | Pop Allocation Load |
|---|---|---|
| Property 1 | Pop A | XL |
| Property 1 | Pop B | XL |
| Property 1 | Pop C | XL |
| Property 1 | Pop D | L |
| Property 1 | Pop E | L |
| Property 1 | Pop F | S |

In addition, each load type can correspond to a coefficient weight. For example coefficient weights may be as specified in Table 3:

TABLE 3

| Load Type | Weight |
|---|---|
| XL | 5 |
| L | 3 |
| S | 1 |

Based on tables 1-3, the load balancer agent can calculate the server needs count for each load type for the property, as shown in Table 4:

TABLE 4

| Load Type | Count | |
|---|---|---|
| XL | 3 * 5 (number of XL loads types, times weight for XL load type) | 15 |
| L | 2 * 3 (number of L load types, times weight for an L load type) | 6 |

TABLE 4-continued

| Load Type | Count | |
|---|---|---|
| S | 1 * 1 (number of S load types, times weight for a S load type) | 1 |
| Sum Total | | 22 |

The load balancer agent can then compute the allocation percentage for the selected property in the selected partition using the following equation:

allocation percentage=((number of a load type at a pop)*(weight of the load type from Table 3))/(sum total from Table 4)

For example, for pop A, the allocation percentage would be computed as: (1*5)/22=0.227 or ~22%. Table 5 shows the allocation percentage for property 1 in each pop:

TABLE 5

| Property ID | Pop ID | Allocation Percentage |
|---|---|---|
| Property 1 | Pop A | (1*5)/22 = ~22% |
| Property 1 | Pop B | (1*5)/22 = ~22% |
| Property 1 | Pop C | (1*5)/22 = ~22% |
| Property 1 | Pop D | (1*3)/22 = ~14% |
| Property 1 | Pop E | (1*3)/22 = ~14% |
| Property 1 | Pop F | (1*1)/22 = ~5% |

Finally, the number of servers needed for property 1 in each pop can be computed with the following equation:

number of servers needed=(minimum server needs from Table 1)*(multiplier from Table 1)*(allocation percentage)

For example, property 1 in pop A would need 20*10*22%=44 servers. Thus, the new server needs for the property 1 in the partition at pop A would be 44 servers.

In some cases, a property may be assigned to two or more overlapping pools. In such cases, the load balancer agent can calculate the pool partition share of the load in the pop. For example, property 1 may be assigned to both a 'North America Pool' and an 'International Pool', with each pool being assigned to at least one common pop. For example, Table 6 depicts an example pool allocation scheme in which the pools are assigned to at least one common pop:

TABLE 6

| Pool ID | Pop ID | Server Count |
|---|---|---|
| North America Pool | Pop A | 80 |
| North America Pool | Pop B | 50 |
| North America Pool | Pop C | 20 |
| International Pool | Pop A | 100 |
| International Pool | Pop G | 50 |
| International Pool | Pop H | 35 |

In this pool allocation scheme, property 1 is assigned to one partition (80 servers) in pop A as part of the North America Pool, and another partition (100 servers) in pop A as part of the International Pool, for a total of 180 servers at pop A. Calculating the partition share in pop A can be accomplished using one of at least two strategies: naïve partition allocation or proportional partition allocation.

Using naïve partition allocation, the load balancer agent can assign the servers needed by the property in the pop to each partition evenly. For example, since property 1 needs 44 servers in pop A, the load balancer agent can assign half of the server needs (22 servers) to the partition corresponding to the North America Pool and half of the server needs (22 servers) to the partition corresponding to the International Pool.

Using proportional partition allocation, by contrast, the load balancer agent can assign the servers needed by the property in the pop to each partition proportionally. For example, the partition at pop A corresponding to the North America Pool has ~44% (80 servers/180 servers) of the servers potentially available to property 1 at pop A, and the partition at pop A corresponding to the International pool has ~55% (100 servers/180 servers) of the servers potentially available to property 1 at pop A. Thus, since property 1 needs 44 servers in pop A, the load balancer agent can proportionally assign 20 of the server needs (44 servers*44%) to the partition corresponding to the North America Pool and 24 of the server needs (44 servers*55%) to the partition corresponding to the International Pool, for a total of 44 servers.

Returning to FIG. 3, method 300 also comprises an act of allocating the property needs to the available servers in the selected partition (act 310). Act 308 can include an act of allocating server resources for at least one property of the sorted plurality of properties at the edge data center based on one or more rules developed from long-term trends, including allocating the server needs for the at least one property to one or more available servers in the partition. For example, act 310 can include load balancer agent 104a allocating the load share to servers in a partition using one or more different criteria. For example, during allocation, load balancer agent 104a can perform one or more of: (i) aggregating server resources, (ii) accounting for stickiness of data, or (iii) accounting for compatibility of properties.

For example, act 308 can include sorting and servers in a partition that are candidates to be assigned to a property according to a weighted average of a resources aggregates index, a stickiness of cached data index, and a compatibility index. For example, a load balancer agent can compute a weighted average for each candidate server in a partition that a property may be assigned to, then sort those servers according to the weighted average. The sorted list of servers provides, in order, the best suitable servers for assignment to the property.

The resources aggregates index provides an indication of an estimate of available resources remaining at a server, and can be computed in any appropriate manner for estimating remaining resources at a server. For example, a load balancer agent can track which properties are allocated to which servers in a partition, and estimate available resources remaining each server given the average load of these properties.

The stickiness of cached data index can indicate how long data has been cached at a server. For example, a load balancer agent can track how long cached data at the servers has been alive. The longer data has been cached, the more valuable the stickiness, since this data would appear to be more valuable.

The compatibility index can provide a score of the compatibility (or incompatibility) of different properties at a server. For example, a load balancer agent can score a server based on the compatibility of properties that are assigned to the server, while factoring in a penalty for the presence of incompatible properties. The load balancer agent can use the compatibility index to minimize incompatible property assignments. For example, since a property that primarily uses network I/O resources may be compatible with a property that primarily uses disk I/O resources, the load balancer agent may assign these properties to the same server, while avoiding assigning other properties that also heavily use network I/O and disk I/O to that server.

Computing a compatibility index can include: (i) obtaining, from the rules, a predefined penalty coefficient for incompatible property types and sizes; (ii) using a compatibility matrix from the rules to obtain a list of all incompatible properties that are hosted at a server, (iii) identifying the load types (e.g., S, M, L, XL) of properties on the server and the frequencies of their occurrence on the server; and (iv) for each incompatible property type, raise their penalty coefficient to the power of the frequency. Computing the compatibility index can be summarized with the following equation:

$$\text{compatibility index} = \left(\prod_{i=1}^{n} c_i^{f_i}\right) * 100$$

where:

n=incompatible properties count of a certain load type,
c=compatibility penalty coefficient, and
f=frequency of occurrence of the incompatible property of the certain load type.

For example, Table 7 represents an example compatibility matrix, which would be defined in the rules, that specifies which property types are compatible with each other:

TABLE 7

| Type 1 | Type 2 |
|---|---|
| T1 | T2 |
| T4 | T1 |
| T4 | T2 |
| T4 | T3 |

For example, property type T1 may be a property that primarily uses disk I/O, while property type T2 may be a property that primarily uses network I/O. In addition, Table 8 represents an example penalty coefficient, defined in the rules, that specifies the penalty for incompatible properties of certain sizes:

TABLE 8

| Load Type | Compatibility Penalty Coefficient |
|---|---|
| XL | 0.6 |
| M | 0.7 |
| S | 0.90 |

If, given the above compatibility index, a server were to be assigned three incompatible XL-sized properties, two incompatible M-sized properties, and one incompatible S-sized property, the compatibility coefficient index for the server would be computed using the above formula as: $(0.6)^3 * (0.7)^2 * (0.9) * 100 = 9.52\%$. By making server assignments in a manner that maximizes the compatibility index score, the load balancer agent can maximize the assignment of compatible properties to the server and make more efficient use of the server's resources.

As discussed previously, a load balancer agent can compute a weighted average for each candidate server in a partition that a property may be assigned to, and then sort those servers according to the weighted average. For example, if a property needs to be assigned to a partition of five servers, computation of the weighted average for one server may be performed as specified in Table 9:

TABLE 9

| Criteria | Criteria Weight | Calculated Value | Description |
|---|---|---|---|
| Resources Aggregates Index | 3 | 80% | The higher the value, the more resources are available |
| Stickiness of Cached Data Index | 1 | 30% | The higher the value, the more the data is valuable |
| Compatibility Index | 2 | 75% | The higher the score, the more the property is compatible with the population of other properties on the server. |
| Weighted Average Value | | 70% | (80*3) + (1*75) + (75*2) = 420/6 = 70% |

A similar weighted average can also be computed for the other four servers in the partition. The five servers can then be sorted according to their weighted average value. Table 10 shows an example sorting:

TABLE 10

| Server ID | Score |
|---|---|
| 1 | 70% |
| 2 | 50% |
| 3 | 50% |
| 4 | 42% |
| 5 | 38% |

The property can then be assigned to the servers according to the sorted order, with servers having a higher score being more suitable for having the property assigned to them.

A property can be assigned to a server by updating a mapping of properties to servers. After making a property assignment, the load balancer agent can adjust the aggregate resource index for the assigned server(s) to account for the resources that will be used by the newly assigned property.

Method 300 may also comprise an act of handling server deficit (act 312). In some instances, a pop may not have enough server resources in a partition to completely assign properties to available servers. When this occurs, act 312 can include the load balancer agent at the pop requesting that some of the load be shared by servers at other pops. This is described further in connection with inter-agent load balancing. If no other pops can handle the requested load, the property may be assigned to the same server at the pop more than once. Act 312 may also include raising one or more alerts, such as to a CDN administrator.

Method 300 also comprises an act of determining whether there are more partitions for the selected property (act 314) and an act of determining whether there are more properties in the sorted property list (act 316). When there are more partitions and/or properties, method 300 can loop back to acts 304 and/or 306, ensuring that all properties and partitions are considered and any appropriate server assignments are made.

2. Inter-Agent Load Balancing with Priority

In some embodiments, a load balancer agent at an edge data center may determine (based on the rules) that load conditions at the edge data center have reached certain parameters that indicate an overload. When this happens, the load balancer agent may contact other load balancer agent(s) at one or more other edge data centers to attempt to offset some of the traffic at the edge data center to one or more other edge data centers. For example, FIG. 1 includes a double-arrow between edge data center 102*a* and edge data center 102*b*, indicating that load balancer agent 104*a* and load balancer agent 104b can communicate with one another (and with other load balancer agents at other edge data centers).

Figure 4:
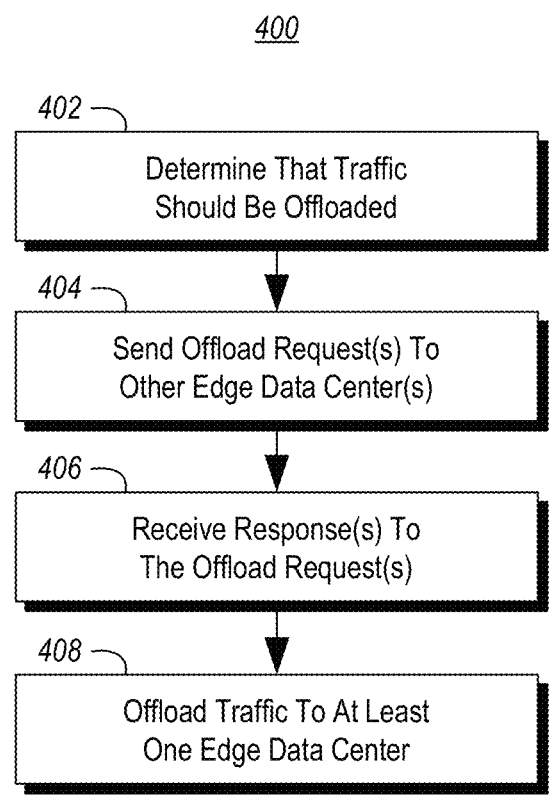
FIG. 4 illustrates a flow chart of an example method for a load balancer agent at an edge data center to offload traffic to another edge data center.

FIG. 4 illustrates a flow chart of an example method 400 for a load balancer agent at an edge data center to offload traffic to another edge data center. Method 400 will be described with respect to the components and data of computer architecture 100.

Method 400 comprises an act of determining that traffic should be offloaded (act 402). Act 402 can include an act determining that traffic at an edge data center should be offloaded to one or more other edge data centers. For example, load balancer agent 104a can consult business rules from rules data store 124 to determine whether traffic should be offloaded. In some embodiments, business rules can take the form of: if <condition> then <action>, using any appropriate structured language (e.g., XML, C#, Java). In some embodiments, example rules may include:

If an agent finds a depletion of resources in the pop up to 70%, then try to offload 25% of the traffic to other pops.

If an agent detects degradation in the health of its pop between 30% and 40%, then try to offload 50% of the traffic to other pops. Health may be measured according to a health index in the NRT data that scores pop health according to factors like how many servers are in/out of rotation, how many servers are loaded, etc.

Method 400 also comprises of an act of sending offload request(s) to other edge data center(s) (act 404). Act 404 can include an act determining a priority level for requesting the offloading of traffic to the other edge data centers. For example, load balancer agent 104a can determine the urgency of offloading traffic to other edge data centers, and determine a priority level accordingly. Other load balancer agents can use the priority when determining whether or not to lend resources to load balancer agent 104a. In some embodiments, priority levels could include the examples specified in Table 11:

TABLE 11

| Priority | Urgency | Example |
| --- | --- | --- |
| 0 | Critical | Pop bandwidth is severely reduced |
| 1 | High | Several traffic surges have caused some heavily loaded properties to jump load levels |
| 2 | Moderate | There are some traffic surges and the load is on the heavy side for some properties |
| 3 | Low | There is some heavy load requiring extra resources |

Act 404 can also include an act of sending an offload request to each of the other edge data centers, each offload request indicating the determined priority level. For example, load balancer agent 104a can send an offload request to load balancer agent 104b at edge data center 102b. Load balancer agent 104a may also send offload requests to one or more other load balancer agents at other edge data centers that are not depicted. When a load balancer agent sends offload requests to a plurality of other load balancer agents, the load balancer agent may do so in a timed, asynchronous manner.

Method 400 also comprises of an act of sending offload request(s) to other edge data center(s) (act 404). Act 404 can include an act of receiving one or more replies from one or more of the other edge data centers, including one or more replies indicating that resources are available for use by the load balancer agent. For example, load balancer agent 104a may receive a reply from one or more of the edge data centers to which it sent the offload request(s). The replies may indicate that the other edge data centers have resources are available for use by the load balancer agent to offload traffic. In some embodiments, the replies include a list of servers at the other edge data center that are available for use. In some embodiments, a reply indicates that the resources are guaranteed to be valid and reserved for use by load balancer agent 104a for a predetermined or negotiated amount of time. Act 404 may also include receiving one or more replies indicating that resources are not available for use by the load balancer agent (i.e., assistance is not possible).

Method 400 also comprises of an act of offloading traffic to at least one edge data (act 408). Act 408 can include an act of sorting the one or more replies to identify at least one edge data center for offloading traffic. For example, if load balancer agent 104a receives affirmative replies from more than one edge data center, load balancer agent 104a can sort these replies to determine to which edge data center(s) traffic should be offloaded. In some embodiments, sorting the replies includes calculating a weighted average of factors for each data center. The factors can include, for example, distance (physical or network) of the edge data center, the cost (e.g., monetary cost for bandwidth) for offloading traffic to the edge data center, and/or the resources that have been made available at the edge data center. For example, even though one edge data center may have a higher monetary cost for use than other available edge data centers, it may be desirable to use that edge data center because it can provide a larger number of resources and other available edge data centers and/or because is it closer than other available edge data centers.

Act 408 can include an act of offloading traffic to the at least one identified edge data center. For example, once a desired edge data center is selected, load balancer agent 104a can send a list of servers that are desired to be used to the identified edge data center, along with a resource manifest. Load balancer agent 104a may offload some traffic to one edge data center, and offload the remaining traffic to one or more other edge data centers.

If an edge data center has made resources available to load balancer agent 104a and load balancer agent 104a will not be making use of those resources (e.g., because it chose to use resources at another edge data center), load balancer agent 104a can inform the edge data center that those resources can be freed. For example, load balancer agent 104a may inform an edge data center that some, or all, of the servers the edge data center made available/reserved can be freed.

Accordingly, method 400 enables an edge data center to leverage resources at other edge data centers when it determines that it is in or is approaching an overload situation.

3. Feedback Loop Between the Central Service and the Rules Database

As discussed previously, load balancer service 122 is, in some embodiments, in two-way communication with long-term trends data store 116 and rules data store 124. As such, load balancer service 122 can be configured to engage in a feedback loop to self-assess and to self-improve the rules based on the long-term trends. Using long-term data from the long-term trends data store 116 as a primary input, the load balancer service 122 can determine optimized settings for configuration parameters and business rules that are in rules data store 124.

In some embodiments, the feedback loop occurs explicitly. For example, when a change is made to a configuration value (e.g., a compatibility penalty, a sort criteria weight), load balancer service 122 can make a snapshot of performance data for the CDN, for a pop, for a property, etc. Then, load balancer service 122 can subsequently analyze the snapshot to ascertain the effect of the change to the configuration value on performance of the relevant component. If there is performance degradation in the CDN due the change, an alert can be generated and/or the configuration value can be automatically adjusted (e.g., reverted).

In additional or alternative embodiments, the feedback loop occurs implicitly. Since log data may be continuously aggregated (e.g., by trends aggregator 118) and analyzed (e.g., by load balancer service 122), and since load balancer service 122 is configured to recognized and adapt to changes in the log data (e.g., daily), changes to the load of a property and/or type of resource consumption by a property should be accounted for eventually.

The feedback loop can work on both live and on simulated logs, and can operate on both live and simulated configuration parameters\rules. Table 12 specifies how implicit and explicit elements of the feedback loop may work on each type.

TABLE 12

| Mode | Implicit | Explicit |
| --- | --- | --- |
| Live | Long-term traffic logs are mined and parameters are adjusted automatically within limits | Changes made to live operating environment will trigger a monitoring job that closely watches performance metrics and will alert in case of performance degradation |
| Simulation | Induced logs can help test the level of adjustments generated | Help model the impact of configuration and rules changes over time |

4. Incubation

Some embodiments include the use of one or more incubation pools. Generally, when a property is first added to a CDN, the CDN can assign the property to an incubation pool. When in an incubation pool, the property is analyzed to ascertain one or more attributes of the property, such as t-shirt size (e.g., S, M, L, XL) and traffic patterns (e.g., peak traffic periods, low traffic periods, etc.). Once the property has been analyzed within the context of the incubation pool, the property can be assigned to a more general pool.

Figure 5:
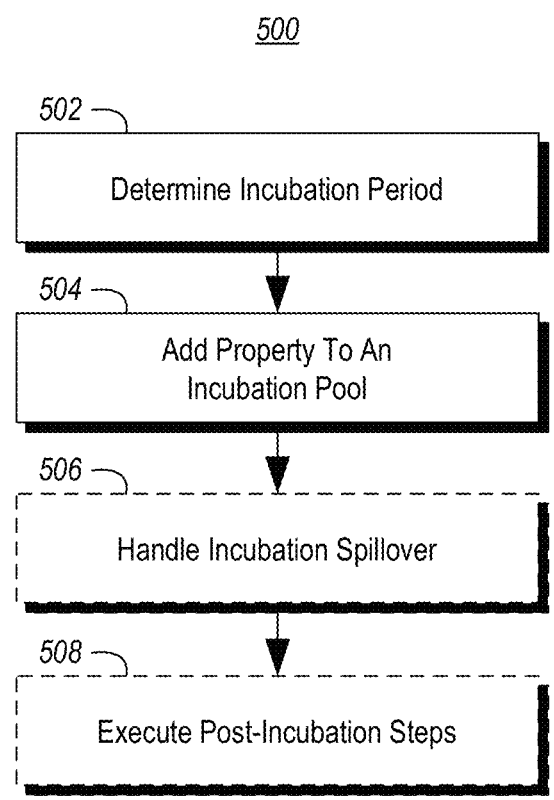
FIG. 5 illustrates a flow chart of an example method for determining one or more attributes of a property using an incubation pool.

FIG. 5 illustrates a flow chart of an example method 500 for determining one or more attributes of a property using an incubation pool. Method 500 will be described with respect to the components and data of computer architecture 100.

Method 500 comprises an act of determining an incubation period (act 502). Act 502 can include an act of determining an incubation period based on an estimate of load size and traffic type for a property and based on one or more rules that define a minimum and a maximum incubation time for properties that are added to an incubation pool. For example, load balancer service 122 or another administrative system within a CDN can determine an incubation period for a property that is to be added to the CDN. Determining the incubation period can be based on information that is provided about the property (e.g., from the customer), and based on general business rules in rules data store 124.

In some embodiments, determining the incubation period is based on a customer truth index (CTI), which can affect the amount of time that a property spends in incubation. If a customer has a high CTI, meaning the CDN has a high level of trust in how a customer characterizes properties, then the CDN may leave that customer's newly added properties in incubation for a shorter period of time. By contrast, if a customer has a low CTI, meaning the CDN has a low level of trust in how a customer characterizes properties, then the CDN may leave that customer's newly added properties in incubation for a longer period of time.

For example, when a customer first on-boards a property to the CDN, the CDN may ask the customer one or more questions about the property. These questions can be designed to help the CDN compute a general approximation of attributes of the property (e.g., load size and type of traffic). If this is the first property that is being on-boarded by the customer, the CDN may apply a relatively low level of trust to the answers that are supplied by the customer, and leave the property in incubation for a longer period of time.

After the property goes into incubation, the CDN can compute the attributes that were previously estimated based on observation of real use of the property. If the computed attributes are similar to those that were approximated based on customer input, then the customer may be assigned a high CTI. If the computed attributes are dissimilar from those that were approximated based on customer input, then the customer may be assigned a low CTI. The CDN may refine the CTI of a customer over time, such as by re-computing the attributes after the property has been released to a production pool and updating the CTI accordingly.

In some embodiments, the CTI is a composite index that is expressed as a percentage. The CTI may be based on the customer's track record of telling the "truth" about property characteristics. The CTI may also be based on the actual performance of the property. The customer's track record and the actual performance of the property may be weighted differently (e.g., a weight of one for customer's truth and a weight of two for actual property performance). For example, if a customer has a historic CTI of 80%, and during the incubation of a new property the actual performance is 90% of the customer's estimates, the new CTI may be computed as (80+(90*2))/3=~86%.

As indicated, determining the incubation period is based on business rules in rules data store 124. For example, the rules may specify a minimum incubation period and a maximum incubation period. The final incubation period may be between the minimum and maximum, based on the CTI. For example, if a customer has a CTI of 90% or greater, then new properties for the customer may be left in incubation for only the minimum period. If the customer has a CTI of less than 90%, then new properties for the customer may be left in incubation for a period greater than the minimum, and approaching the maximum as the CTI score gets lower.

Method 500 also comprises an act of adding a property to an incubation pool (act 504). Act 504 can include an act of adding the property to the incubation pool, including allocating one or more server resources of the incubation pool to the property. For example, load balancer service 122 or another administrative system within the CDN can assign the property to a special pool that is set apart as an incubation pool. As such, the property can be assigned to corresponding partitions at edge data centers/pops.

Act 504 can also include an act of analyzing load and traffic patterns for the property for the determined incubation period. For example, during its time in the incubation pool, load balancer service 122 can analyze the client load patterns, the type of content that is served by the property, the types of resources that are utilized at servers of edge data centers when serving clients, etc. Act 504 can also include an act of determining one or more of a load size or a traffic type for the property based on adding the property to the incubation pool. For example, using the data collected during incubation (e.g., client load patterns, the type of content that is served by the property, the type of resources that are utilized at servers of edge data centers), the CDN can compute the size and traffic type of the property, and store this information in rules data store 124.

Method 500 may also comprise an act of handling incubation spillover (act 506). For example, the rules in rules data store 124 may specify conditions under which a newly incubated property can spill over its allocated resources and use additional resources. In one example, the rules may specify that a property for a VIP customer may be automatically allowed to spill over, and that spillover is disabled by default for non-VIP properties. In another example, the rules may specify that spillover can be enabled for a property if the property exhibits a constant growth that exceeds certain thresholds. The rules may also specify conditions for ceasing a spillover.

Act 506 can include an act of determining that the property exceeds the one or more allocated server resources, and allocating one or more additional resources to the property. For example, load balancer service 122 or another administrative system within the CDN may determine that a property is growing larger than its allocated resources, and that is it permitted to spill over. In response, the CDN may allocate the property greater resources within the incubation pool, spill over to resources within another incubation pool, and/or spill over to resources within a non-incubation pool (e.g., for a VIP customer).

Method 500 may also comprise an act of executing post-incubation steps (act 508). For example, after the incubation period has ended, it may be determined that insufficient information has been gathered about the property. As such, the incubation period for the property may be extended. In another example, the CTI index for the property's customer may be updated, as described above. In yet another example, the customer may be billed for time the property spent in the incubation phase, and/or billing rules may be updated based on information gathered during incubation.

Method 500 may also comprise stressing the property. For example, while the property is in incubation, the CDN may run a stress test load on the property. Doing so can help to determine the property's behavior patterns and the property's impact on the CDN during extreme load scenarios. In some embodiments, a customer may be given favorable billing treatment if they opt to be subject to a stress test. For example, during on-boarding the customer may be offered an option to execute a stress test against the property. The customer may be able to specify stress test parameters, such as stress test duration, the type(s) of synthetic test data to use as part of the stress test, etc. The types and boundaries of stress test parameters can be defined in the rules. The CDN can use un-utilized or under-utilized resources within the CDN, special-purpose resources within the CDN, and/or resources that are separate from the CDN to generate the stress load.

Accordingly, prior to unleashing a property on general CDN resources, incubation can help to acquire data about a property and to define rules surrounding the property. Doing so can help to refine the CDN's relationships with customers, and to protect the integrity of CDN resources.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media includes recordable-type storage devices, such as RAM, ROM, EEPROM, solid state drives ("SSDs"), flash memory, phase-change memory ("PCM"), optical disk storage, magnetic disk storage or other magnetic storage devices, or any other physical storage medium which can be used to store program code in the form of computer-executable instructions or data structures, and which can be accessed by a general-purpose or special-purpose computer system.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for determining one or more attributes of a property using an incubation pool, the method comprising:
   receiving user input from a customer specifying a property that is requested to be on-boarded to a content delivery network (CDN);
   based at least on receiving the user input from the customer specifying the property that is requested to be on-boarded to the CDN, prompting the customer for one or more attributes for the property, including prompting the customer for one or both of the customer's estimate of a load size for the property, and the customer's estimate of a traffic type for the property;
   based at least on prompting the customer for the one or more attributes for the property, receiving one or both of the customer's estimate of the load size for the property and the customer's estimate of the traffic type for the property;
   determining an incubation period for keeping the property in an incubation pool, the incubation period being based on one or both of the customer's estimate of the load size for the property and the customer's estimate of the traffic type for the property, the incubation period being adjusted based on a customer truth index (CTI) for the customer, the CTI indicating a level of trust of the customer's estimates, the incubation period being adjusted toward a lower incubation time when the CTI indicates a high level of trust of the customer's estimates, and the incubation period being adjusted toward a higher incubation time when the CTI indicates a low level of trust of the customer's estimates;
   adding the property to the incubation pool, including allocating one or more server resources of the incubation pool to the property;
   analyzing load and traffic patterns for the property for the determined incubation period;
   determining one or both of a calculated load size for the property and a calculated traffic type for the property based on adding the property to the incubation pool; and
   adjusting the CTI for the customer based on one or both of how close the customer's estimate of the load size for the property matches the calculated load size for the property, and based on based on how close the customer's estimate of the traffic type for the property matches the calculated traffic type for the property.

2. The method as recited in claim 1, wherein adjusting the CTI includes calculating a weighted average relating to how close the customer's estimate of the load size for the property matches the calculated load size for the property, or based on how close the customer's estimate of the traffic type for the property matches the calculated traffic type for the property.

3. The method as recited in claim 1, further comprising:
   applying an induced stress load on the property which the property is added to the incubation pool.

4. The method as recited in claim 1, further comprising:
   determining that the property exceeds the one or more allocated server resources, and allocating one or more additional resources to the property.

5. The method as recited in claim 4, wherein allocating one or more additional resources to the property comprises allocating one or more additional resources from the incubation pool.

6. The method as recited in claim 4, wherein allocating one or more additional resources to the property comprises allocating one or more additional resources from another incubation pool.

7. The method as recited in claim 4, wherein allocating one or more additional resources to the property comprises allocating one or more additional resources from a non-incubation pool.

8. The method as recited in claim 1, further comprising:
   determining that additional information about the property is needed; and
   extending the incubation period.

9. A computer system, comprising:
one or more processors;
system memory; and
one or more computer-readable storage media having stored thereon computer-executable instructions that are executed executable by the one or more processors, and that configure the computer system to determine one or more attributes of a property using an incubation pool, including computer-executable instructions that configure the computer system to perform at least the following:
identify a property that is to be on-boarded to a content delivery network (CDN);
prompt a customer for one or more attributes for the property, including prompting the customer for one or both of the customer's estimate of a load size for the property, and the customer's estimate of a traffic type for the property;
based at least on prompting the customer for the one or more attributes for the property, receive one or both of the customer's estimate of the load size for the property and the customer's estimate of the traffic type for the property;
determine an incubation period for keeping the property in an incubation pool, the incubation period being based on one or both of the customer's estimate of the load size for the property and the customer's estimate of the traffic type for the property, the incubation period being adjusted based on a customer truth index (CTI) for the customer, the CTI indicating a level of trust of the customer's estimates, the incubation period being adjusted toward a lower incubation time when the CTI indicates a high level of trust of the customer's estimates, and the incubation period being adjusted toward a higher incubation time when the CTI indicates a low level of trust of the customer's estimates;
add the property to the incubation pool, including allocating one or more server resources of the incubation pool to the property;
analyze load and traffic patterns for the property for the determined incubation period;
determine one or both of a calculated load size for that property and a calculated traffic type for the property based incubating the property; and
adjust the CTI for the customer based on one or both of how close the customer's estimate of the load size for the property matches the calculated load size for the property, and based on based on how close the customer's estimate of the traffic type for the property matches the calculated traffic type for the property.

10. The computer system as recited in claim 9, wherein the computer-executable instructions that configure the computer system to adjust the CTI include computer-executable instructions that configure the computer system to calculate a weighted average relating to how close the customer's estimate of the load size for the property matches the calculated load size for the property, or based on how close the customer's estimate of the traffic type for the property matches the calculated traffic type for the property.

11. The computer system as recited in claim 9, also including computer-executable instructions that configure the computer system to:
apply an induced stress load on the property which the property is added to the incubation pool.

12. The computer system as recited in claim 9, also including computer-executable instructions that configure the computer system to:
determine that the property exceeds the one or more allocated server resources, and allocating one or more additional resources to the property.

13. The computer system as recited in claim 12, wherein the computer-executable instructions that configure the computer system to allocate one or more additional resources to the property include computer-executable instructions that configure the computer system to allocate one or more additional resources from the incubation pool.

14. The computer system as recited in claim 12, wherein the computer-executable instructions that configure the computer system to allocate one or more additional resources to the property include computer-executable instructions that configure the computer system to allocate one or more additional resources from another incubation pool.

15. The computer system as recited in claim 12, wherein the computer-executable instructions that configure the computer system to allocate one or more additional resources to the property include computer-executable instructions that configure the computer system to allocate one or more additional resources from a non-incubation pool.

16. The computer system as recited in claim 9, also including computer-executable instructions that configure the computer system to:
determine that additional information about the property is needed; and
extend the incubation period.

17. A computer program product comprising one or more hardware storage devices having stored thereon computer-executable instructions that are executable by one or more processors of a computer system, and that configure the computer system to determine one or more attributes of a property using an incubation pool, including computer-executable instructions that configure the computer system to perform at least the following:
receive user input from a customer specifying a property that is requested to be on-boarded to a content delivery network (CDN);
based at least on receiving the user input from the customer specifying the property that is requested to be on-boarded to the CDN, identify one or more attributes for the property, including receiving one or both of the customer's estimate of a load size for the property, and the customer's estimate of a traffic type for the property;
determine an incubation period for keeping the property in an incubation pool, the incubation period being based on one or both of the customer's estimate of the load size for the property and the customer's estimate of the traffic type for the property, the incubation period being adjusted based on a customer truth index (CTI) for the customer, the CTI indicating a level of trust of the customer's estimates, the incubation period being adjusted toward a lower incubation time when the CTI indicates a high level of trust of the customer's estimates, and the incubation period being adjusted toward a higher incubation time when the CTI indicates a low level of trust of the customer's estimates;
add the property to the incubation pool, including allocating one or more server resources of the incubation pool to the property;
analyze load and traffic patterns for the property for the determined incubation period;
determine one or both of a calculated load size for that property and a calculated traffic type for the property based incubating the property; and
adjust the CTI for the customer based on one or both of how close the customer's estimate of the load size for the property matches the calculated load size for the property, and based on based on how close the customer's estimate of the traffic type for the property matches the calculated traffic type for the property.

18. The computer program product as recited in claim 17, wherein the computer-executable instructions that configure the computer system to adjust the CTI include computer-executable instructions that configure the computer system to calculate a weighted average relating to how close the customer's estimate of the load size for the property matches the calculated load size for the property, or based on how close the customer's estimate of the traffic type for the property matches the calculated traffic type for the property.

19. The computer program product as recited in claim 17, also including computer-executable instructions that configure the computer system to:
apply an induced stress load on the property which the property is added to the incubation pool.

20. The computer program product as recited in claim 17, also including computer-executable instructions that configure the computer system to:
determine that the property exceeds the one or more allocated server resources, and allocating one or more additional resources to the property.

* * * * *